United States Patent Office 3,746,712
Patented July 17, 1973

3,746,712
6-(SUBSTITUTED-PHENYL)-5-METHYL-4,5-DI-
HYDRO-3(2H)-PYRIDAZINONES
Adma Schneller Ross, 65 Campbell Ave., Suffern, N.Y.
10901, and William Vincent Curran, 27 Harding St.,
Pearl River, N.Y. 10965
No Drawing. Filed June 8, 1971, Ser. No. 151,154
Int. Cl. C07d 51/04
U.S. Cl. 260—250 A                  10 Claims

ABSTRACT OF THE DISCLOSURE

This disclosure describes compounds of the class of 6-(substituted-phenyl) - 5 - methyl - 4,5 - dihydro-3(2H)-pyridazinones useful as hypotensive agents.

BRIEF SUMMARY OF THE INVENTION

This invention relates to new organic compounds and, more particularly, is concerned with novel 6-(substituted-phenyl) - 5 - methyl - 4,5 - dihydro-3(2H)-pyridazinones and with methods of preparing these compounds. The novel compounds of the present invention may be represented by the following general formula:

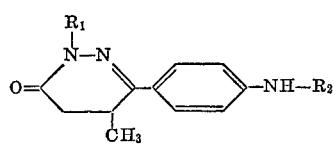

wherein $R_1$ is hydrogen or methyl and $R_2$ is hydrogen or lower alkanoyl. Suitable lower alkanoyl groups contemplated by the present invention are those having up to four carbon atoms such as formyl, acetyl, propionyl, n-butyryl and isobutyryl.

DETAILED DESCRIPTION OF THE
INVENTION

The novel compounds of the present invention are generally obtainable as white crystalline materials having characteristic melting points and absorption spectra and which may be purified by recrystallization from common solvents such as water, ethanol, acetone and mixtures thereof. They are soluble in many organic solvents such as ethyl acetate, chloroform, dimethylformamide, and the like but are relatively insoluble in non-polar solvents such as hexane and diethyl ether.

The novel compounds of the present invention may be readily prepared from an appropriate lower alkanoyl-aminobenzene (I) as set forth in the following reaction scheme:

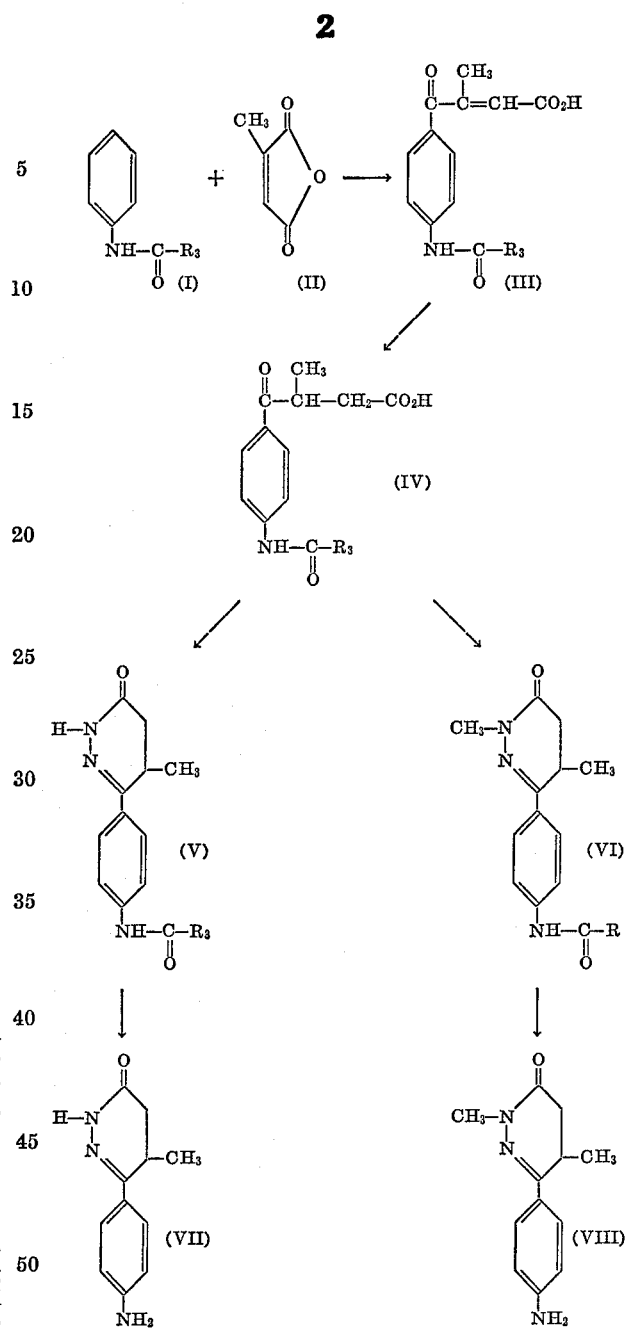

wherein $R_3$ is hydrogen, methyl, ethyl, n-propyl or isopropyl. In accordance with the above reaction scheme, an anilide (I) such as formanilide, acetanilide, propionanilide, n-butyranilide or isobutyranilide is reacted with citraconic anhydride (II) to provide the corresponding 3-(p-acylaminobenzoyl)crotonic acid (III). This reaction is carried out in the presence of aluminum chloride in a solvent such as carbon disulfide at the reflux temperature for a period of a few hours and then at room temperature for a few days. Reduction of the 3-(p-acylaminobenzoyl)crotonic acid (III) with zinc dust in glacial acetic acid affords the corresponding 3-(p-acylaminobenzoyl)butyric acid (IV). This reduction is preferably carried out at steam bath temperature for a period of 30 minutes to a few hours. Condensation of a 3-(p-acylaminobenzoyl)butyric acid (IV) with hydrazine provides the corresponding 6-(p-acylaminophenyl)-5-methyl-4,5 - dihydro - 3(2H) - pyridazinone (V) whereas condensation of a 3 - (p - acylaminobenzoyl)butyric acid (IV) with methylhydrazine provides the corresponding 6-(p-acylaminophenyl) - 2,5 - dimethyl - 4,5 - dihydro-3(2H)-pyridazinone (VI). This condensation, with either hydrazine or methylhydrazine, is best carried out in ethanol as solvent at the reflux temperature for a few hours. Hydrolysis of a 6-(p-acylaminophenyl)-5-methyl-4,5 - dihydro - 3(2H) - pyridazinone (V) or a 6-(p-acylaminophenyl) - 2,5 - dimethyl - 4,5 - dihydro - 3(2H)-pyridazinone (VI) affords 6-(p-aminophenyl)-5-methyl-4,5 - dihydro - 3(2H) - pyridazinone (VII) or 6 - (p-aminophenyl) - 2,5 - dimethyl - 4,5 - dihydro - 3(2H)-pyridazinone (VIII), respectively. This hydrolysis may be readily carried out with aqueous sodium hydroxide in methanol as solvent at the reflux temperature for a period of a few hours.

Typical compounds of the present invention which may be thus prepared are, for example, 6-(p-formamidophenyl)-5-methyl-4,5-dihydro-3(2H)-pyridazinone, 6-(p-isobutyramidophenyl)-5-methyl-4,5-dihydro-3(2H)-pyridazinone, 6-(p-aminophenyl)-2,5-dimethyl-4,5-dihydro-3(2H)-pyridazinone, 6-(p-propionamidophenyl)-2,5-dimethyl-4,5-dihydro-3(2H)-pyridazinone and 6-(p-n-butyramidophenyl)-2,5-dimethyl-4,5-dihydro-3(2H)-pyridazinone.

The novel compounds of the present invention have long lasting hypotensive activity which was demonstrated in the following test procedure. Conscious male albino Sherman strain rats averaging approximately 250 grams in weight were fastened to rat boards in a supine position by means of canvas vests and limb ties. The femoral areas were anesthetized (subcutaneous infiltration of lidocaine), and the left or right common iliac arteries were exposed and clamped off proximally by an artery clamp and distally with thread. Incisions were made near the tie and short nylon catheters were inserted and tied in place. The other end of the catheters were fitted with 24 gauge hubless needles attached to thick-walled polyethylene tubes. The test compounds were administered to the animals orally by gavage (stomach tube). istered to the animals orally by gavage (stomach tube). The test compounds were ordinarily suspended or dissolved in 2 percent aqueous starch solution, one milliliter of which gave, per 100 grams of body weight, the desired dose. Mean arterial blood pressure was measured 4 and 24 hours after administration of the compounds. Comparisons were then made for the mean control pressure of 122 mm. of mercury which is the average of a number of controls recorded over months of testing. Blood pressure measurements were made with four Statham P23 Db strain gauges (Statham Instruments, Inc., Los Angeles, Calif.), attached to a Sanborn Polyviso Recorder equipped with four strain gauge preamplifiers with averaging circuits for measuring mean arterial pressure.

Table I below summarizes the activity of typical compounds of the present invention and compares them with two previously disclosed compounds. It is obvious from an examination of Table I that the compounds of this invention (No. 1, 2 and 3) possess hypotensive activity which is considerably longer lasting than that of the previously disclosed compounds (No. 4 and 5).

TABLE I

| Compound [1] | No. of rats | Median arterial blood pressure (mm. of Hg) | |
|---|---|---|---|
| | | 4 hours | 24 hours |
| 1 ........ 6-(p-acetamidophenyl)-5-methyl-4, 5-dihydro-3(2H)-pyridazinone. | 3 | 73 | 89 |
| 2 ........ 6-(p-aminophenyl)-5-methyl-4, 5-dihydro-3(2H)-pyridazinone. | 3 | 68 | 92 |
| 3 ........ 6-(p-acetamidophenyl)-2, 5-dimethyl-4, 5-dihydro-3(2H)-pyridazinone. | 2 | 86 | 94 |
| 4 ........ 6-(p-acetamidophenyl)-4, 5-dehydro-3(2H)-pyridazinone.[2] | 3 | 77 | 119 |
| 5 ........ 6-(p-aminophenyl)-4, 5-dihydro-3(2H)-pyridazinone.[2] | 3 | 79 | 110 |
| 6 ........ Controls | 25 | 123 | 122 |

[1] All compounds dosed at 100 mg./kg. of body weight.
[2] Disclosed in U.S. Patent No. 3,475,431.

For therapeutic administration, the active compounds of this invention may be incorporated with excipients and used, for example, in the form of tablets, troches, capsules, elixirs, suspensions, syrups, wafers, and the like. Such compounds and preparations should contain at least 0.1% of active compound. The percentage in the compositions and preparations may, of course, be varied and may conveniently be between about 5% to about 75% or more of the weight of the unit. The amount of active compound in such therapeutically useful compositions or preparations is such that a suitable dosage will be obtained. Preferred compositions or preparations according to the present invention are prepared so that a dosage unit form contains between about 20 and about 250 milligrams of active compound.

The tablets, troches, pills, capsules and the like may contain the following: a binder such as gum tragacanth, acacia, corn starch or gelatin; a disintegrating agent such as corn starch, potato starch, alignic acid and the like; a lubricant such as magnesium stearate; and a sweetening agent such as sucrose or saccharin may be added or a flavoring agent such as peppermint, oil of wintergreen or cherry flavoring. A syrup or elixir may contain the active compounds, sucrose as a sweetening agent, methyl and propyl parabens as preservatives, a dye and a flavoring such as cherry or orange flavor.

The novel compounds of the present invention possess an asymetric carbon atom at the 5-position and hence may exist in more than one stereoisomeric form. It is to be understood that the present invention includes within its scope all such stereoisomeric forms.

The invention will be described in greater detail in conjunction with the following specific examples which are given solely for the purpose of illustration and are not to be construed as limitations of this invention.

EXAMPLE 1

Preparation of 3-(p-acetamidobenzoyl)crotonic acid

Acetanilide (135 g.) is added to a cold, mechanically stirred, suspension of 490 g. of aluminum chloride in 650 ml. carbon disulfide. After heating ceases, 112 g. citraconic anhydride is added. The mixture is refluxed with stirring until the mixture congeals and then allowed to stand at room temperature for five days. Carbon disulfide is decanted, the complex is decomposed using ice and conc. hydrochloric acid, and the aqueous layer and solid are extracted into benzene and then into aqueous bicarbonate. The bicarbonate solution is acidified to pH 2 to precipitate a brown gum which is extracted with ethyl acetate, evaporated to dryness, and crystallized from acetone-water to give white crystals, M.P. 132°–134° C.

EXAMPLE 2

Preparation of 3-(p-acetamidobenzoyl)butyric acid

A solution of 5 g. of 3-(p-acetamidobenzoyl)crotonic acid in 3 ml. of glacial acetic acid plus 45 ml. of water is heated with 3 g. zinc dust on a steam bath for 30 minutes. The zinc is filtered off and conc. hydrochloric acid is added to the filtrate to precipitate the product. Recrystallization from ethanol gives white crystals, M.P. 147°–149° C.

EXAMPLE 3

Preparation of 6-(p-acetamidophenyl)-5-methyl-4,5-dihydro-3(2H)-pyridazinone

To a solution of 14.6 g. of 3-(p-acetamidobenzoyl) butyric acid in 40 ml. ethanol is added 2 ml. hydrazine. The solution is refluxed for two hours, cooled, and white crystals are filtered off and recrystallized from ethanol; M.P. 234°–236° C.

EXAMPLE 4

Preparation of 6-(p-aminophenyl)-5-methyl-4,5-dihydro-3(2H)-pyridazinone

A solution of 2.5 g. of 6-(p-acetamidophenyl)-5-methyl-4,5-dihydro-3(2H)-pyridazinone in 25 ml. aqueous sodium hydroxide and 25 ml. methanol is refluxed for several hours. The methanol is evaporated and the solution is diluted with water and stored at 4° C. overnight. White crystals are filtered off; M.P. 195°–197° C.

EXAMPLE 5

Preparation of 6-(p-acetamidophenyl)-2,5-dimethyl 4,5-dihydro-3(2H)-pyridazinone A solution of 1.0 g. of 6-(p-acetamidobenzoyl)butyric acid and 0.2 ml. methylhydrazine in 5 ml. ethanol is refluxed for 1.5 hours, cooled and crystals are filtered off. Recrystallization from acetone-hexane gives white crystals; M.P. 145°–147° C.

EXAMPLE 6

Preparation of 6-(p-aminophenyl)-2,5-dimethyl-4,5-dihydro-3(2H)-pyridazinone

The procedure of Example 4 is repeated, substituting an equimolecular amount of 6-(p-acetamidophenyl)-2,5-dimethyl-4,5-dihydro-3(2H)-pyridazinone for the 6-(p-acetamidophenyl) - 5 - methyl - 4,5 - dihydro - 3(2H)-pyridazinone employed in that example. There is thus obtained the 6-(p-aminophenyl)-2,5-dimethyl-4,5-dihydro-3(2H)-pyridazinone in equally good yield.

What is claimed is:
1. A compound of the formula:

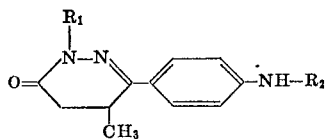

wherein $R_1$ is selected from the group consisting of hydrogen and methyl and $R_2$ is selected from the group consisting of hydrogen and lower alkanoyl.

2. The compound according to claim 1, wherein $R_1$ and $R_2$ are hydrogen; 6-(p-aminophenyl)-5 - methyl - 4,5-dihydro-3(2H)-pyridazinone.

3. The compound according to claim 1, wherein $R_1$ is methyl and $R_2$ is hydrogen; 6-(p-aminophenyl) - 2,5 - dimethyl-4,5-dihydro-3(2H)-pyridazinone.

4. The compound according to claim 1, wherein $R_1$ is hydrogen and $R_2$ is acetyl; 6 - (p - acetamidophenyl) - 5-methyl-4,5-dihydro-3(2H)-pyridazinone.

5. The compound according to claim 1, wherein $R_1$ is methyl and $R_2$ is acetyl; 6-(p-acetamidophenyl)-2,5-dimethyl-4,5-dihydro-3(2H)-pyridazinone.

6. The compound according to claim 1, wherein $R_1$ is hydrogen and $R_2$ is propionyl; 6-(p-propionamidophenyl)-5-methyl-4,5-dihydro-3(2H)-pyridazinone.

7. The compound according to claim 1, wherein $R_1$ is methyl and $R_2$ is propionyl; 6-(p-propionamidophenyl)-2,5-dimethyl-4,5-dihydro-3(2H)-pyridazinone.

8. The compound according to claim 1, wherein $R_1$ is methyl and $R_2$ is formyl; 6-(p-formamidophenyl)-2,5-dimethyl 4,5-dihydro-3(2H)-pyridazinone.

9. The compound according to claim 1, wherein $R_1$ is hydrogen and $R_2$ is n-butyryl; 6-(p-n-butyramidophenyl)-5-methyl-4,5-dihydro-3(2H)-pyridazinone.

10. The compound according to claim 1, wherein $R_1$ is methyl and $R_2$ is isobutyryl; 6-(p-isobutyramidophenyl)-2,5-dimethyl-4,5-dihydro-3(2H)-pyridazinone.

References Cited
UNITED STATES PATENTS
3,475,431  10/1969  Bachmann et al. ___ 260—250 A NICHOLAS S. RIZZO, Primary Examiner U.S. Cl. X.R.
424—250